US009486789B2

(12) United States Patent
Decottignies et al.

(10) Patent No.: US 9,486,789 B2
(45) Date of Patent: Nov. 8, 2016

(54) FISCHER-TROPSCH CATALYST BASED ON A METAL OF GROUP VIIIB AND AN OXIDES SUPPORT COMPRISING ALUMINA, SILICA, A SPINEL AND PHOSPHORUS

(71) Applicants: IFP Energies nouvelles, Rueil-Malmaison (FR); ENI S.P.A., Roma (IT)

(72) Inventors: Dominique Decottignies, Saint-Genis-Laval (FR); Fabrice Diehl, Lyons (FR); Vincent Lecocq, Orlienas (FR); Marie Velly, Maclas (FR)

(73) Assignees: IFP Energies nouvelles, Rueil-Malmaison (FR); ENI S.P.A., Rome (IT)

( * ) Notice: Subject to any disclaimer, the term of this patent is extended or adjusted under 35 U.S.C. 154(b) by 0 days.

(21) Appl. No.: 14/663,731

(22) Filed: Mar. 20, 2015

(65) Prior Publication Data
US 2015/0266006 A1     Sep. 24, 2015

(30) Foreign Application Priority Data

Mar. 20, 2014   (FR) .................................... 14 52311

(51) Int. Cl.
| | | |
|---|---|---|
| *B01J 21/04* | (2006.01) | |
| *B01J 21/12* | (2006.01) | |
| *B01J 23/34* | (2006.01) | |
| *B01J 23/58* | (2006.01) | |
| *B01J 27/185* | (2006.01) | |
| *B01J 23/75* | (2006.01) | |
| *C10G 2/00* | (2006.01) | |
| *B01J 37/02* | (2006.01) | |
| *B01J 37/08* | (2006.01) | |

(52) U.S. Cl.
CPC ............ *B01J 27/1853* (2013.01); *B01J 23/75* (2013.01); *B01J 37/0205* (2013.01); *B01J 37/08* (2013.01); *C10G 2/33* (2013.01); *C10G 2/332* (2013.01); *C10G 2/342* (2013.01)

(58) Field of Classification Search
CPC ........ B01J 21/04; B01J 21/12; B01J 21/063; B01J 21/066; B01J 23/005; B01J 23/02; B01J 23/04; B01J 23/06; B01J 23/075; B01J 23/34; B01J 23/462; B01J 23/58; B01J 23/90; B01J 23/70; B01J 23/72; B01J 23/74; B01J 23/745; B01J 23/75; B01J 23/755; B01J 23/78; B01J 23/80; B01J 23/8892; B01J 27/1853; C10G 2/342; C10G 2/33; C10G 2/332
USPC ................ 502/214, 213, 524, 326, 328–331; 518/715
See application file for complete search history.

(56) References Cited

U.S. PATENT DOCUMENTS

| | | | | |
|---|---|---|---|---|
| 3,751,508 A * | 8/1973 | Fujiso et al. ........... | B01J 23/755 502/331 |
| 4,172,810 A * | 10/1979 | Mitchell, III ......... | B01J 23/005 502/302 |
| 5,895,772 A * | 4/1999 | Grigorova ............ | B01D 53/945 502/304 |
| 6,218,335 B1 * | 4/2001 | Okada .................... | B01J 23/005 423/604 |
| 8,143,186 B2 * | 3/2012 | Rytter ..................... | B01J 23/755 502/259 |
| 2002/0045671 A1 * | 4/2002 | Chao .................... | B01J 23/8896 518/715 |
| 2008/0017551 A1 * | 1/2008 | Kiriyama ................. | B01J 21/12 208/134 |
| 2011/0015062 A1 | 1/2011 | Kim et al. | |
| 2013/0199966 A1 | 8/2013 | Koranne et al. | |
| 2013/0324623 A1 | 12/2013 | Maury et al. | |
| 2015/0267124 A1 * | 9/2015 | Decottignies ............ | C10G 2/33 518/715 |

FOREIGN PATENT DOCUMENTS

| | | | | |
|---|---|---|---|---|
| EP | 2669006 A1 | 12/2013 | | |
| EP | 2 921 227 | * 9/2015 | ............. B01J 23/75 |
| WO | 2009/119977 | * 10/2009 | ............. C07C 1/04 |
| WO | 2009119977 A2 | 10/2009 | | |
| WO | 2012020210 A2 | 2/2012 | | |

OTHER PUBLICATIONS

Search Report for FR-1452311 dated Aug. 1, 2014.

\* cited by examiner

*Primary Examiner* — Patricia L Hailey
(74) *Attorney, Agent, or Firm* — Millen White Zelano and Branigan, PC; Csaba Henter; John Sopp

(57) ABSTRACT

The present invention describes a catalyst containing an active phase comprising at least one metal of group VIIIB selected from cobalt, nickel, ruthenium and iron deposited on an oxides support comprising alumina, silica, a spinel and phosphorus. It also concerns the process for preparation of said catalyst and its use in a Fischer-Tropsch process. The catalyst has an improved hydrothermal and mechanical resistance in a Fischer-Tropsch process while improving its catalytic performances.

15 Claims, No Drawings

FISCHER-TROPSCH CATALYST BASED ON A METAL OF GROUP VIIIB AND AN OXIDES SUPPORT COMPRISING ALUMINA, SILICA, A SPINEL AND PHOSPHORUS

The present invention relates to the field of Fischer-Tropsch synthesis processes and in particular a catalyst having an improved hydrothermal and mechanical resistance in a Fischer-Tropsch process, said catalyst being characterised by an oxides support comprising alumina, silica, phosphorus and a spinel.

Fischer-Tropsch synthesis processes make it possible to produce a wide range of hydrocarbon cuts from the mixture CO+$H_2$, commonly referred to as synthesis gas. The overall equation of Fischer-Tropsch synthesis can be written as follows:

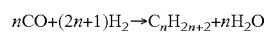

$nCO + (2n+1)H_2 \rightarrow C_nH_{2n+2} + nH_2O$

Fischer-Tropsch synthesis is at the heart of the processes for the conversion of natural gas, coal or biomass into fuels or intermediates for the chemical industry. Those processes are referred as GtL (Gas to Liquids using the Anglo-Saxon terminology) in the case of using natural gas as the initial charge, CtL (Coal to Liquids using the Anglo-Saxon terminology) for coal and BtL (Biomass to Liquids using the Anglo-Saxon terminology) for the biomass. In each of those cases the initial charge is firstly gasified into synthesis gas, a mixture of carbon monoxide and dihydrogen. The synthesis gas is then transformed in respect of the majority part thereof into paraffins by virtue of Fischer-Tropsch synthesis and those paraffins can then be transformed into fuels by a hydroisomerisation-hydrocracking process. For example transformation processes such as hydrocracking, deparaffining and hydroisomerisation of heavy cuts (C16+) make it possible to produce different types of fuels in the range of medium distillates: diesel (cut 180-370° C.) and kerosene (cut 140-300° C.). The lighter C5-C15 fractions can be distilled and used as solvents.

The catalysts used for Fischer-Tropsch synthesis are essentially catalysts based on cobalt or iron, even if other metals can be used. Nonetheless cobalt and iron offer a good compromise in terms of levels of performance/price in relation to the other metals.

The Fischer-Tropsch synthesis reaction can be carried in different types of reactors (fixed bed, moving bed or three-phase bed (gas, liquid, solid) for example of the perfectly agitated autoclave type, or slurry bubble column), and the products of the reaction have in particular the characteristic of being free from sulphur, nitrogen or aromatic type compounds.

In a use in a reactor of bubble column type (or "slurry bubble column" to use the English terminology, or again "slurry" to use a simplified expression), use of the catalyst is characterised in that it is divided into the state of very fine powder, typically of the order of some tenths of a micrometer, that powder forming a suspension with the reaction medium.

The Fischer-Tropsch reaction takes place in conventional fashion at between 1 and 4 MPa (between 10 and 40 bars) at temperatures which are conventionally between 200° C. and 350° C. The reaction is overall exothermic, which necessitates particular attention being paid to use of the catalyst.

When used in the Fischer-Tropsch synthesis processes and in particular in the processes of "slurry" type, as defined hereinbefore, the catalyst is subjected to particularly severe conditions in terms of mechanical and chemical stress.

In fact, the very high linear speeds encountered in the "slurry" processes give rise to inter-particulate shocks or against the walls of the items of equipment, which shocks can give rise to the formation of fines. The term fines is used to denote any particle of the size smaller than the minimum size of the new catalyst. Thus if the granulometric distribution of a new catalyst begins at 30 μm the term fines denotes all particles of a size of less than 30 μm. The formation of such fines is crippling as it reduces the levels of performance of the catalyst on the one hand and it can clog the solid/liquid separation system on the other hand. Moreover those fines, in particular those of submicronic size, can also be entrained in the products of the reaction without being separated therefrom, and that can give rise to problems for example upon conversion of those products by hydrocracking or hydroconversion.

In addition to those mechanical stresses the solid operates under stringent hydrothermal conditions, that is to say under partial water vapour pressures (water being a fatal co-product of the reaction). The amount of water produced during the Fischer-Tropsch synthesis being substantial under the conditions of the reaction the water partial pressure within the Fischer-Tropsch reactor can attain several bars. It is therefore necessary for the catalyst to be perfectly adapted to such reaction conditions and in particular to the presence of water. The harmful effect of water on an alumina-based catalyst has been described in the literature (J. P. Franck et coll., in *Journal of the Chemical Society—Chemical Communications*, 10 (1984), 629-630). In that publication, by a reaction with water, even under mild conditions (low temperature and low pressure), the alumina is partially transformed into boehmite, which causes the catalyst to be rendered fragile from a mechanical point of view.

In the case of use in a three-phase reactor ("slurry"), that chemical impairment, linked to the severe hydrodynamic conditions described hereinbefore, results in marked attrition.

Thus it is necessary to reduce to the maximum degree the formation of fines by modifying for example the composition the catalyst and of its support so that it is more resistant to the phenomenon of chemical and mechanical attrition.

Numerous works have been carried out in the aim of stabilising the support in relation to the processes of hydration/redissolution of the support in a Fischer-Tropsch process.

The use of phases of spinel structures of $MAl_2O_4$ type or mixed spinels $M_xM'_{(1-x)}Al_2O_4$ has been described in the documents FR2879478 and WO 2005/072866, M and M' generally being divalent metals such as Mg, Sn, Ni, Co and Cu. Mention may also be made of the publications by Rotan et coll. in *Journal of the European Ceramic Society* 33 (2013) 1-6 and Rytter et coll. in *Top. Catal.* 54 (2011) 801-810. In that case the divalent metal (in particular nickel) is introduced in the form of a precursor of nitrate type for example at a level of a few percent on the initial support containing alumina. The spinel phase is formed by calcination at very high temperature and stabilises the whole of the support.

The addition of silica in an alumina-based support containing a spinel phase as defined hereinbefore has been described in the document FR2879478. That document does not disclose the addition of phosphorus.

WO 2009/014292 describes the use of an alumina support upgraded with phosphorus permitting an improvement in the hydrothermal resistance of a catalyst in a Fischer-Tropsch reaction. The introduction of the phosphorus to the alumina support with bimodal porosity and with a high specific surface area makes it possible in that case to improve the dispersion of the active cobalt-based phase and thus to optimise reactivity, but also to limit the formation of oxide phases of cobalt (in particular cobalt aluminate) by virtue of the water formed during the reaction. In that case the part played by the phosphorus essentially involves limiting the cobalt-support interactions to optimise dispersion and reactivity and to limit sintering of the cobalt (and therefore its deactivation). The disadvantage of the invention lies in the fact that it is applied to aluminas of considerable specific surface areas (300 to 800 m$^2$/g) and with a bimodal pore size distribution (between 1 and 25 nm for the first pore range and between 25 and 150 nm for the second pore range claimed).

In that context one of the objects of the present invention is to propose a catalyst enjoying improved hydrothermal and mechanical resistance in a Fischer-Tropsch process while improving its levels of catalytic performance, which catalyst can also be prepared from a support irrespective of both its specific surface area and the nature of its pore distribution.

DESCRIPTION OF THE INVENTION

The invention concerns a catalyst based on at least one metal of group VIIIB and an oxides support comprising alumina, silica, a spinel and phosphorus. More particularly the invention concerns a catalyst containing an active phase comprising at least one metal of group VIIIB selected from cobalt, nickel, ruthenium and iron deposited on an oxides support comprising alumina, silica, phosphorus and at least one simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded.

It has been shown that the simultaneous presence of alumina, silica, phosphorus and a spinel in the support affords the final catalyst hydrothermal resistance and resistance to attrition, which are very much superior to the catalysts of the state of the art which contain only one, two or three of those four components, while improving its levels of catalytic performance. Without being bound down to any theory it seems that the simultaneous presence of alumina, silica, phosphorus and a spinel in the support shows a synergistic effect in terms of the improvement in hydrothermal and mechanical resistance, that synergistic effect not being observed when two or three of the components are present (alumina and phosphorus, alumina and silica, alumina and silica and spinel), nor being foreseeable by the simple addition of the effects of improving hydrothermal resistance, which are known, by virtue of the addition either of phosphorus or spinel or silica to an alumina.

Consequently an object of the present invention is to propose a catalyst which, by virtue of the simultaneous presence of alumina, silica, phosphorus and a spinel in the support of said catalyst, has improved hydrothermal and mechanical resistance in relation to the catalysts in the state of the art while improving its levels of catalytic performance.

Another object of the present invention is to propose a a catalyst which can be prepared from a support irrespective of its specific surface area and the nature of its pore distribution and in particular from an alumina irrespective of its specific surface area and the nature of its pore distribution. More particularly the improvement in the hydrothermal and mechanical resistance of the catalyst and therefore ultimately the improvement in catalytic activity in the long term can be observed with catalysts prepared from aluminas which can have specific surface areas of less than 300 m$^2$/g, monomodal pore distributions and pore sizes of the order of 2 to 50 nm, with a mean pore size of between 5 and 25 nm, preferably between 8 and 20 nm. In fact, the phenomenon of the drop in specific surface area with the addition of phosphorus to the alumina support described in the state of the art is very moderate if the support further comprises silica and a spinel. That therefore gives a greater degree of flexibility in the choice of the support and makes it possible in particular to prepare catalysts from aluminas which are conventionally used for the synthesis of Fischer-Tropsch catalysts, that is to say aluminas having specific surface areas of between 150 m$^2$/g and 250 m$^2$/g, a monomodal pore distribution and pore sizes of the order of 2 to 50 nm, with a mean pore size of between 5 and 25 nm, preferably between 8 and 20 nm.

In a preferred variant said support is a phosphorus-containing silica-alumina or a phosphorus-containing silica-containing alumina in which spinel is included.

In a variant the silica content of said support is between 0.5% by weight and 30% by weight with respect to the weight of the support, and the phosphorus content of said support is between 0.1% by weight and 10% by weight of said element, with respect to the weight of the support.

In a variant the spinel content is between 3 and 50% by weight with respect to the weight of the support. In a variant the content of metal M or M' is between 1 and 20% by weight with respect to the weight of the support.

In a preferred variant M is cobalt or nickel in the case of a simple spinel and M is cobalt and M' is magnesium or zinc in the case of a mixed spinel.

In a variant the metal of group VIIIB is cobalt.

In a variant the content of metal of group VIIIB is between 0.5 and 60% by weight with respect to the weight of the catalyst.

According to a variant the alumina from which the support is prepared has a specific surface area of between 50 m$^2$/g and 500 m$^2$/g, a pore volume measured by mercury porosimetry of between 0.4 ml/g and 1.2 ml/g and a monomodal pore distribution.

In a variant the support further comprises a simple oxide selected from titanium oxide ($TiO_2$), ceria ($CeO_2$) and zirconia ($ZrO_2$), alone or as a mixture.

In a variant the catalyst further comprises at least one dopant selected from a noble metal of groups VIIB or VIIIB, an alkali metal element or an alkaline-earth element or an element of group IIIA.

The invention also concerns a process for preparation of the catalyst according to the invention comprising the following steps:

a) an oxides support comprising alumina and silica is provided, b) said oxides support comprising alumina and silica is impregnated with an aqueous or organic solution of a phosphorus precursor, followed by drying and calcination so as to obtain a support comprising alumina, silica and phosphorus, c) the support comprising alumina, silica and phosphorus is impregnated with an aqueous or organic solution comprising at least one salt of metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe)

and manganese (Mn) followed by drying and calcination at a temperature of between 700 and 1200° C. so as to obtain a simple spinel $MAl_2O_4$ or a mixed spinel $M_xM'_{(1-x)}Al_2O_4$ which is or is not partial, in which M and M' are separate metals and x is between 0 and 1, the values 0 and 1 being themselves excluded, and d) the oxides support comprising alumina, silica, spinel and phosphorus is impregnated with an aqueous or organic solution comprising at least one metal from group VIIIB selected from cobalt, nickel, ruthenium and iron, followed by drying and calcination at a temperature of between 320° C. and 460° C. so as to obtain said catalyst.

Finally the invention also concerns a Fischer-Tropsch process for synthesis of hydrocarbons in which the catalyst according to the invention or prepared according to the process for the preparation of said catalyst is brought into contact with a charge comprising synthesis gas under a total pressure of between 0.1 and 15 MPa at a temperature of between 150 and 350° C., at an hourly space velocity of between 100 and 20000 volumes of synthesis gas per volume of catalyst and per hour (100 to 20000 $h^{-1}$) with a $H_2/CO$ molar ratio of the synthesis gas of between 0.5 and 4.

In a preferred variant the Fischer-Tropsch process is carried out in a reactor of slurry bubble column type.

Hereinafter the groups of chemical elements are set forth in accordance with the CAS classification (CRC Handbook of Chemistry and Physics, publisher CRC press, editor in chief D. R. Lide, 81st edition, 2000-2001). For example the group VIIIB according to the CAS classification corresponds to the metals of columns 8, 9 and 10 in accordance with the new IUPAC classification.

The textural and structural properties of the support and the catalyst described hereinafter are determined by the characterisation methods known to the man skilled in the art. The total pore volume and the pore distribution are determined in the present invention by mercury porosimetry (cf. Rouquerol F.; Rouquerol J.; Singh K. "Adsorption by Powders & Porous Solids: Principle, methodology and applications", Academic Press, 1999). More particularly the total pore volume is measured by mercury porosimetry in accordance with the standard ASTM D4284-92 with a wetting angle of 140°, for example by means of an apparatus being the Autopore III™ of the brand Micromeritics™. The specific surface area is determined in the present invention by the B.E.T. method, that method being described in the same reference work as mercury porosimetry, and more particularly in accordance with the standard ASTM D3663-03.

DETAILED DESCRIPTION

The Catalyst According to the Invention

The invention concerns a catalyst containing an active phase comprising at least one metal of group VIIIB selected from cobalt, nickel, ruthenium and iron deposited on an oxides support comprising alumina, silica, phosphorus and at least one simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded. It is in fact the simultaneous presence of alumina, silica, phosphorus and a spinel in the support which imparts to the final catalyst a hydrothermal resistance and resistance to attrition which are much superior to those known from the catalysts according to the prior art.

The active phase comprises at least one metal of group VIIIB selected from cobalt, nickel, ruthenium and iron. Preferably the active phase comprises cobalt. Very preferably the active phase is formed by cobalt.

The content of metal of group VIIIB selected from cobalt, nickel, ruthenium and iron is between 0.01 and 60% by weight with respect to the weight of the catalyst.

In the situation where the active phase comprises at least one metal selected from cobalt, nickel and iron the content of said metal represents 1 to 60% by weight, preferably 5 to 30% by weight and very preferably 10 to 30% by weight with respect to the weight of the catalyst.

In the situation where the active phase comprises ruthenium, the content of ruthenium is between 0.01 and 10% by weight, and very preferably between 0.05 and 5% by weight with respect to the weight of the catalyst.

The active phase of said catalyst may further advantageously comprise at least one dopant selected from a noble metal of groups VIIB or VIIIB, an alkali metal element (element of group IA) or an alkaline-earth element (element of group IIA) or an element of group IIIA. The dopant makes it possible to improve the reducibility of the metal of group VIIIB and therefore its activity or its selectivity or again makes it possible to slow down its deactivation.

When at least one dopant is present the content of dopant or dopants is generally between 20 ppm and 1% by weight and preferably between 0.01 and 0.5% by weight with respect to the weight of the catalyst.

When the dopant is selected from a noble metal of groups VIIB or VIIIB it is preferably selected from platinum (Pt), palladium (Pd), rhodium (Rh) or again rhenium (Re).

When the dopant is selected from an alkali metal element or an alkaline-earth element it is preferably selected from potassium (K), sodium (Na), magnesium (Mg) or calcium (Ca).

When the dopant is selected from an element of group IIIA it is preferably selected from boron (B).

The support of the catalyst used for carrying out the hydrocarbon synthesis process according to the invention is a support of oxides comprising and is preferably formed by alumina, silica, at least one spinel as described above and phosphorus.

The alumina present in the oxides support generally has a crystallographic structure of the delta (δ), gamma (γ), theta (θ) or alpha (α) alumina type, alone or as a mixture.

The support comprising alumina, silica, at least one spinel and phosphorus can be prepared from alumina irrespective of its specific surface area and the nature of its pore distribution. The specific surface area of the alumina from which the support is prepared is generally between 50 $m^2/g$ and 500 $m^2/g$, preferably between 100 $m^2/g$ and 300 $m^2/g$, more preferably between 150 $m^2/g$ and 250 $m^2/g$. The pore volume of the alumina from which the support is prepared is generally between 0.4 ml/g and 1.2 ml/g and preferably between 0.45 ml/g and 1 ml/g.

The pore distribution of the pores in the alumina from which the support is prepared may be of monomodal, bimodal or plurimodal type. It is preferably of monomodal type. The pore size is of the order of 2 to 50 nm, with a mean pore size of between 5 and 25 nm, preferably between 8 and 20 nm.

The characteristics of the alumina which are mentioned hereinbefore correspond to the characteristics of the alumina from which the support is prepared, that is to say prior to the introduction of the silica, the phosphorus, the metals M and possibly M' for the formation of the spinel phase, the active phase and possible dopants.

The content of silica in the support varies from 0.5% by weight to 30% by weight, preferably from 1% by weight to 25% by weight and still more preferably from 1.5 to 20% by weight with respect to the weight of the support.

The reference to a support comprising alumina and silica is used to denote a support in which the silicon and the aluminium are in the form of agglomerates of silica or alumina respectively, amorphous aluminosilicate or any other mixed phase containing silicon and aluminium, provided that the support is not mesostructured. Preferably the alumina and the silica are present in the form of a mixture of oxides $SiO_2$—$Al_2O_3$, referred as silica-alumina or silica-containing alumina. The reference to silica-containing alumina is used to denote an alumina comprising between 0.5 and 10% by weight of silica with respect to the weight of the support. The reference to silica-alumina is used to denote an alumina comprising a percentage of silica that is strictly greater than 10% by weight ranging up to 30% by weight with respect to the weight of the support. Said silica-alumina or silica-containing alumina is homogeneous on the micrometer scale and still more preferably homogeneous on the nanometer scale.

The content of phosphorus in the support varies from 0.1% by weight to 10% by weight of said element and preferably from 0.3% to 5% by weight and still more preferably from 0.5 to 3% by weight with respect to the weight of the support.

Without being bound down to any theory the phosphorus present in the oxides support is advantageously present in a mixed form of aluminophosphate type ($AlPO_4$) for example, or again in the form of phosphates, polyphosphates, pyrophosphates, phosphonates, phosphinates, phosphines, phosphinites, phosphonites, or phosphites groups present at the surface of the solid, with or without interaction with the spinel phase described below.

The spinel in the oxides support is a simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded.

In a very preferred manner M is cobalt or nickel in the case of a simple spinel. Very preferably M is cobalt and M' is magnesium or zinc in the case of a mixed spinel.

Particularly preferably the spinel is a simple spinel $MAl_2O_4$ in which M is cobalt.

The spinel content is generally between 3 and 50% by weight and preferably between 5 and 40% by weight with respect to the weight of the support.

The content of metal M or M' is between 1 and 20% by weight and preferably between 2 and 10% by weight with respect to the weight of the support.

The formation of the simple or mixed spinel structure in said support, often referred to as the step for stabilisation of the support, can be performed by any method known to the man skilled in the art. It is generally effected by introducing the metal M or M' in the form of a salt precursor for example of nitrate type to the initial support containing alumina. By calcination at very high temperature the spinel phase in which the metal M or M' are in aluminate form is formed and stabilises the whole of the support.

The presence of spinel phase in the catalyst used in the Fischer-Tropsch process according to the invention is measured by temperature programmed reduction (TPR using the Anglo-Saxon terminology) such as for example described in *Oil & Gas Science and Technology*, Rev. IFP, Vol. 64 (2009), No. 1, pp. 11-12. In that procedure the catalyst is heated under a flow of a reducing agent, for example a flow of dihydrogen. Measurement of the dihydrogen consumed in dependence on temperature gives quantitative information about the reducibility of the species present. The presence of a spinel phase in the catalyst is manifested therefore by a consumption of dihydrogen at a temperature higher than about 800° C.

Preferably the oxides support comprising alumina, silica, at least one spinel as described above and phosphorus is a phosphorus-containing silica-alumina or a phosphorus-containing silica-containing alumina, in which the spinel is included, said support preferably having a silica content of between 0.5% by weight and 30% by weight with respect to the weight of the support and a phosphorus content of between 0.1 and 10% by weight of said element with respect to the weight of the support, which support further contains at least one spinel phase as described above.

When the oxides support is a phosphorus-containing silica-alumina the silica content is higher than 10% by weight ranging up to 30% by weight with respect to the weight of the support and the phosphorus content is between 0.1 and 10% by weight of said element with respect to the weight of the support which further contains at least one spinel as described above.

When the oxides support is a phosphorus-containing silica-containing alumina the silica content is between 0.5% by weight and 10% by weight with respect to the weight of the support and the phosphorus content is between 0.1 and 10% by weight of said element with respect to the weight of the support which further contains at least one spinel as described above.

The specific surface area of the oxides support comprising alumina, silica, as least one spinel as described above and phosphorus is generally between 50 $m^2/g$ and 500 $m^2/g$, preferably between 100 $m^2/g$ and 300 $m^2/g$, more preferably between 150 $m^2/g$ and 250 $m^2/g$. The pore volume of said support is generally between 0.3 ml/g and 1.2 ml/g and preferably between 0.4 ml/g and 1 ml/g.

The oxides support comprising alumina, silica, at least one spinel as described above and phosphorus may also comprise a simple oxide selected from titanium oxide ($TiO_2$), ceria ($CeO_2$) and zirconia ($ZrO_2$), alone or as a mixture.

The support on which said active phase is deposited may involve a morphology in the form of balls, extrudates (for example of trilobal or quadrilobal shape) or pellets, in particular when said catalyst is used in a reactor functioning in a fixed bed fashion, or it may involve morphology in the form of powder of variable granulometry, in particular when said catalyst is used in a reactor of slurry bubble column type.

The specific surface area of the catalyst comprising the active phase and the oxides support comprising alumina, silica, at least one spinel as described above and phosphorus is generally between 50 $m^2/g$ and 500 $m^2/g$, preferably between 80 $m^2/g$ and 250 $m^2/g$, more preferably between 90 $m^2/g$ and 150 $m^2/g$. The pore volume of said catalyst is generally between 0.2 ml/g and 1 ml/g and preferably between 0.25 ml/g and 0.8 ml/g. Preferably the pore distribution is monomodal.

Preferably the catalyst according to the invention comprises an active phase comprising cobalt and an oxides support comprising a phosphorus-containing silica-alumina or a phosphorus-containing silica-containing alumina in which a spinel is included, the content of silica in the support being preferably between 1.5 and 20% by weight with respect to the weight of the support and the content of phosphorus in the support preferably being between 0.3 and 5% by weight of said element with respect to the weight of the support, said spinel being a simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded.

Particularly preferably the catalyst used for carrying out the Fischer-Tropsch process according to the invention is a catalyst in which the active phase is formed by cobalt and the oxides support is formed by a phosphorus-containing silica-alumina or a phosphorus-containing silica-containing alumina in which a spinel is included, the content of silica $SiO_2$ of the support is between 1.5% and 20% by weight with respect to the weight of the support and the phosphorus content of the support is between 0.3 and 5% by weight of said element with respect to the weight of the support, said spinel being $CoAl_2O_4$.

Process for Preparation of the Catalyst

The invention also concerns a process for preparation of the catalyst according to the invention.

Any process making it possible to obtain said catalyst and in particular said support, modified by the simultaneous or sequential addition of silicon, phosphorus and metal M or M' to the alumina forms part of the invention. Preparation of the catalyst generally comprises in a first stage preparation of the oxides support comprising alumina, silica and phosphorus and then, in a second stage, introduction of the active phase.

In a preferred variant the process for the preparation of the catalyst according to the invention comprises the following steps:

a) an oxides support comprising alumina and silica is provided, b) said oxides support comprising alumina and silica is impregnated with an aqueous or organic solution of a phosphorus precursor, followed by drying and calcination so as to obtain a support comprising alumina, silica and phosphorus, c) the support comprising alumina, silica and phosphorus is impregnated with an aqueous or organic solution comprising at least one salt of metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) followed by drying and calcination at a temperature of between 700 and 1200° C. so as to obtain a simple spinel $MAl_2O_4$ or a mixed spinel $M_xM'_{(1-x)}Al_2O_4$ which is or is not partial, in which M and M' are separate metals and x is between 0 and 1, the values 0 and 1 being themselves excluded, and d) the oxides support comprising alumina, silica, spinel and phosphorus is impregnated with an aqueous or organic solution comprising at least one salt of metal from group VIIIB selected from cobalt, nickel, ruthenium and iron, followed by drying and calcination at a temperature of between 320° C. and 460° C. so as to obtain said catalyst.

In accordance with step a) a support comprising alumina and silica is provided. The silica $SiO_2$ content may vary from 0.5% by weight to 30% by weight, preferably from 1% by weight to 30% by weight and still more preferably from 1.5 to 20% by weight with respect to the weight of the support. Preferably, a support of silica-alumina or silica-containing alumina is provided. Such a support can be purchased or manufactured, for example by atomisation of an alumina precursor in the presence of a compound comprising silicon. The support comprising alumina and silica can be provided by any other means known to the man skilled in the art, for example by impregnation of an organosilylated compound of TEOS type (tetraethylorthosilicate) on an alumina. In that case that impregnation followed by drying and calcination is preliminary to step a) described hereinbefore.

In accordance with step b) said support comprising alumina and silica is impregnated with an aqueous or organic solution of a phosphorus precursor, then said support comprising alumina, silica and phosphorus is dried and calcined.

The impregnation step b) is advantageously performed by at least one solution containing at least one phosphorus precursor. In particular that step can advantageously be carried out by dry impregnation, by excess impregnation or again by precipitation-deposit in accordance with methods well known to the man skilled in the art. Preferably the impregnation step is performed by dry impregnation, preferably at ambient temperature, and preferably at a temperature equal to 20° C. The impregnation step involves bringing the support comprising alumina and silica into contact with at least one solution containing at least one phosphorus precursor, the volume of which is equal to the pore volume of the support to be impregnated. That solution contains the phosphorus precursor at the desired concentration to achieve on the final support the phosphorus content which is the aim, preferably between 0.1% by weight and 10% by weight, preferably between 0.3% by weight and 5% by weight and particularly preferably between 0.5 and 3% by weight with respect to the weight of the support.

The phosphorus precursor used may be any phosphorus precursor known to the man skilled in the art. It is advantageously possible to use phosphoric acid and its phosphate derivatives, phosphorous acid and its phosphonate derivatives, phosphinic acid and its phosphinate derivatives, phosphonic acid and its phosphonate derivatives, pyrophosphoric acid and its phosphate derivatives, diphosphorus pentoxide, phosphines, phosphites, phosphinites or phosphonites. Preferably the phosphoric acid in aqueous solution is used.

The solid comprising alumina, silica and phosphorus is then dried and calcined. Drying is advantageously effected at a temperature of between 60° C. and 200° C., preferably for a period of time ranging from 30 minutes to three hours. Calcination is advantageously effected at a temperature of between 200° C. and 1100° C., preferably for a period of time ranging from 1 hour to 24 hours, preferably 2 hours to 8 hours. Calcination is generally effected in an oxidising atmosphere, for example in air, or in air with a reduced oxygen content; it can also be effected at least in part in nitrogen.

All the drying and calcination steps described in the present description can be implemented using any procedure known to the man skilled in the art: fixed bed, fluidised bed, oven, muffle furnace and rotary furnace.

Step c) comprises impregnation, preferably dry impregnation, of the support comprising alumina, silica and phosphorus, with an aqueous solution of one or more salts of a metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn), preferably cobalt, nickel, magnesium, calcium and zinc and very preferably cobalt and nickel and particularly preferably cobalt, followed by drying and calcination at a temperature of between 700 and 1200° C.

The metal M or M' is brought into contact with the support by way of any metallic precursor which is soluble in an aqueous phase. Preferably the precursor of the metal of group VIIIB is introduced in an aqueous solution, preferably in the form of nitrate, carbonate, acetate, chloride, oxalate, complexes formed by a polyacid or an acid-alcohol and its salts, complexes formed with acetylacetonates or any other inorganic derivative soluble in aqueous solution, which is brought into contact with said support. In the preferred case where the metal M is cobalt the cobalt precursor advantageously used is cobalt nitrate, cobalt oxalate or cobalt acetate.

The content of metal M or M' is advantageously between 1 and 20% by weight and preferably between 2 and 10% by weight with respect to the total mass of the final support.

The drying operation is advantageously performed at a temperature of between 60° C. and 200° C., preferably for a period ranging from 30 minutes to three hours.

The calcination operation is effected at a temperature of between 700 and 1200° C., preferably between 850 and 1200° C. and in preferred fashion between 850 and 900° C., generally for a period of between an hour and 24 hours and preferably between 2 hours and 5 hours. Calcination is generally effected in an oxidising atmosphere, for example in air, or in air with a reduced oxygen content; it can also be effected at least in part in nitrogen. It makes it possible to transform the precursors M and M' and alumina into a structure of spinel type (aluminate or M and M').

In a variant the calcination operation can also be effected in two stages, said calcination operation being advantageously performed at a temperature of between 300° C. and 600° C. in air for a period between half an hour and 3 hours, then at a temperature between 700° C. and 1200° C., preferably between 850 and 1200° C. and in preferred fashion between 850 and 900° C., generally for a period of between an hour and 24 hours and preferably between 2 hours and 5 hours.

Thus, on issuing from said step c), the support comprising alumina, silica and phosphorus further comprises a simple spinel $MAl_2O_4$ or mixed spinel $M_xM'_{(1-x)}Al_2O_4$ which is or is not partial, in which the metals M and M' are in the form of aluminates.

According to step d) impregnation of the support comprising alumina, silica, spinel and phosphorus is advantageously implemented by at least one solution containing at least one precursor of said metal of group VIIIB selected from cobalt, nickel, ruthenium and iron. In particular that step can advantageously be implemented by dry impregnation, by excess impregnation or again by precipitation-deposit using methods well known to the man skilled in the art. Preferably the impregnation step is performed by dry impregnation, preferably at ambient temperature, and preferably at a temperature equal to 20° C. That impregnation step involves bringing said oxides support into contact with at least one solution containing at least one precursor of said metal of group VIIIB, the volume thereof being equal to the pore volume of the support to be impregnated. That solution contains the metallic precursor of the metal or metals of group VIIIB at the desired concentration to achieve on the final catalyst the amount of metal which is the aim, advantageously a metal content of between 0.5 and 60% by weight and preferably between 5 and 30% by weight with respect to the weight of the catalyst.

The metal or metals of group VIIIB are brought into contact with the support by way of any metallic precursor which is soluble in an aqueous phase or an organic phase. When it is introduced in an organic solution the precursor of the metal of group VIIIB is preferably the oxalate or acetate of the metal of group VIIIB. Preferably the precursor of the metal of group VIIIB is introduced in aqueous solution, preferably in the form of nitrate, carbonate, acetate, chloride, oxalate, complexes formed by a polyacid or an acid-alcohol and its salts, complexes formed with acetylacetonates, or any other inorganic derivative soluble in aqueous solution, which is brought into contact with said support. In the preferred case where the metal of group VIIIB is cobalt the cobalt precursor advantageously used is cobalt nitrate, cobalt oxalate or cobalt acetate. Most preferably the precursor used is cobalt nitrate.

The resulting catalyst is then dried and calcined. The drying operation is advantageously effected at a temperature of between 60° C. and 200° C., preferably for a period ranging from 30 minutes to three hours. Calcination is advantageously carried out at a temperature of between 320° C. and 460° C., preferably between 350 and 440° C. and preferably between 360 and 420° C. It is preferably carried out for a period of between 15 minutes and 15 hours and preferably between 30 minutes and 12 hours and still more preferably between 1 hour and 6 hours. Calcination is generally effected in an oxidising atmosphere, for example air, or in air with a reduced oxygen content; it can also be effected at least in part in nitrogen.

Impregnation of said active phase of step d) can be effected in a single impregnation step or a plurality of impregnation steps. In the case of relatively high contents of metals impregnation in two steps or indeed in three steps is preferred. Between each of the impregnation steps it is preferable to optionally effect at least one supplementary drying and/or calcination step under the conditions described hereinbefore, and/or a supplementary reduction step under the conditions described hereinafter.

The step d) for impregnation of the support with the active phase may also advantageously comprise at least one supplementary step consisting of depositing at least one dopant selected from a noble metal of groups VIIB or VIIIB, an alkali metal element (element of group IA) or an alkaline-earth element (element of group IIA) or an element of group IIIA, alone or as a mixture, on said oxides support.

Deposit of the dopant on the support may advantageously be performed by any method known to the man skilled in the art, preferably by impregnation of said oxides support by at least one solution containing at least one precursor of said dopant and preferably by dry impregnation or by excess impregnation. That solution contains at least one precursor of the dopant at the desired concentration to achieve on the final catalyst the content of dopant which is the aim, advantageously a content of dopant of between 20 ppm and 1% by weight and preferably between 0.01 and 0.5% by weight with respect to the weight of the catalyst.

Subsequently the catalyst containing the dopant is dried and calcined under the same conditions as those described in the drying and calcination steps upon impregnation of the active phase.

Impregnation of the active phase and the dopant may also be effected using a single solution (co-impregnation).

Preparation of the catalyst according to the invention and in particular preparation of the support may be effected by other variants.

In another variant in the preparation of the catalyst according to the invention it is possible to combine steps b) and c) to introduce the phosphorus and the metal M or M' in a single stage on the support comprising alumina and silica.

In accordance with another variant for preparation of the catalyst it may be envisaged that the precursors of silicon, metal M or M' and phosphorus are simultaneously introduced into the support comprising alumina.

The support comprising alumina, silica, spinel and phosphorus, without this being restrictive, may be preformed or in powder form.

Likewise it is possible for said support to be prepared by co-precipitation of an aqueous solution containing the elements Al, Si, P, M or M' in the form of nitrate for example for aluminium and M or M', and acid or acid salt for the phosphorus and the silicon, by means of an aqueous solution of carbonate or hydrogen carbonate, followed by a washing operation, a drying operation and a calcination operation.

It is also possible to prepare the support by a sol-gel process or again by complexing of an aqueous solution containing the elements M or M' Al, Si and P by at least one alpha acid-alcohol added at a rate of 0.5 to 2 moles of acid per mole of elements M or M' Al, Si and P, followed by a drying operation under vacuum leading to the production of a homogeneous vitreous substance, and then a calcination operation.

Prior to its use in the Fischer-Tropsch synthesis catalytic reactor the catalyst is generally subjected to a reducing treatment, for example in pure or dilute hydrogen, at high temperature, which is intended to activate the catalyst and form particles of metal in the zero valent state (in metallic form). That treatment can be effected in situ (in the same reactor as that in which the Fischer-Tropsch synthesis operation is effected) or ex situ before being loaded into the reactor. The temperature of that reducing treatment is preferably between 200° C. and 500° C. and its duration is generally between 2 and 20 hours.

Fischer-Tropsch Process

The present invention also concerns a Fischer-Tropsch process by bringing a charge comprising synthesis gas into contact under Fischer-Tropsch synthesis operating conditions with at least one catalyst according to the invention or prepared according to the process for preparation according to the invention.

The Fischer-Tropsch process permits the production of essentially straight-chain and saturated $C_5^+$ hydrocarbons. According to the invention the expression essentially straight-chain and saturated $C_5^+$ hydrocarbons is used to denote hydrocarbons whose proportion of hydrocarbon compounds having at least 5 carbon atoms per molecule represents at least 50% by weight, preferably at least 80% by weight of the whole of the hydrocarbons formed, the total content of olefinic compounds present among said hydrocarbon compounds having at least 5 carbon atoms per molecule being less than 15% by weight. The hydrocarbons produced by the process of the invention are thus essentially paraffinic hydrocarbons whose fraction having the highest boiling points can be converted with a high yield into medium distillates (diesel and kerosene cuts) by a catalytic hydroconversion process such as hydrocracking and/or hydroisomerisation.

Preferably the charge used for carrying out the process of the invention is formed by the synthesis gas which is a mixture of carbon monoxide and hydrogen of $H_2/CO$ molar ratios which can vary between 0.5 and 4 in dependence on the production process from which it results. The $H_2/CO$ molar ratio of the synthesis gas is generally close to 3 when the synthesis gas is obtained from the alcohol or hydrocarbon vapour reforming process. The $H_2/CO$ molar ratio of the synthesis gas is of the order of 1.5 to 2 when the synthesis gas is obtained from a partial oxidation process. The $H_2/CO$ molar ratio of the synthesis gas is generally close to 2.5 when it is obtained from an autothermal reforming process. The $H_2/CO$ molar ratio of the synthesis gas is generally close to 1 when it is obtained from a process for gasification and reforming of hydrocarbons with $CO_2$ (referred to as dry reforming).

The Fischer-Tropsch process according to the invention is operated under a total pressure of between 0.1 and 15 MPa, preferably between 0.5 and 10 MPa, at a temperature of between 150 and 350° C., preferably between 180 and 270° C. The hourly space velocity is advantageously between 100 and 20000 volumes of synthesis gas per volume of catalyst and per hour (100 to 20000 $h^{-1}$) and preferably between 400 and 10000 volumes of synthesis gas per volume of catalyst and per hour (400 to 10000 $h^{-1}$).

The Fischer-Tropsch process according to the invention can be carried out in a reactor of perfectly agitated autoclave type, boiling bed type, slurry bubble column type, fixed bed type or moving bed type. Preferably it is carried out in a reactor of slurry bubble column type.

Accordingly the size of the grains of the catalyst used in the Fischer-Tropsch process can be between a few microns and 2 millimeters. Typically, for an implementation in a three-phase reactor of "slurry" type (slurry bubble column), the catalyst is finely divided and is in the form of particles. The size of the catalyst particles will be between 10 and 500 micrometers (µm), preferably between 10 and 300 µm and very preferably between 120 and 150 µm and still more preferably between 20 and 120 µm.

The invention is illustrated by the following Examples.

Example 1

Preparation of the Catalysts a to G (Comparative) and the Catalysts H to L (According to the Invention)

Catalyst a (Non-Conforming): Catalyst 15% Co on Alumina

A catalyst A formed by Co/alumina is prepared by dry impregnation of an aqueous solution of cobalt nitrate on a commercial alumina (Puralox® Sasol Germany) in powder form (mean granulometry=90 µm) of 170 $m^2/g$.

After 12 hours of drying in an oven at 120° C. the solid is calcined for 2 hours at 420° C. in a flow of air in a reactor of traversed bed type. The solid obtained contains 9.2% by weight of Co. That intermediate substance is subjected to a fresh impregnation operation using a solution of cobalt nitrate, then a drying operation and a calcination operation which are identical to the preceding step. The final catalyst A is obtained in two preparation steps, containing 15.2% by weight of cobalt.

Catalyst B (Non-Conforming): Catalyst 15% Co on Silica-Containing Alumina with 5% $SiO_2$.

A solution of cobalt nitrate is impregnated on a commercial support Siralox® (Sasol Germany) containing 5% by weight of $SiO_2$ of a granulometry centered on 80 µm. The solid is then dried for 12 hours at 120° C. and then calcined in air for 2 hours at 420° C. The cobalt content is then 8.5% by weight. A second impregnation operation is then carried out in the same manner as before, followed by drying and calcination. The final solid B then contains 14.9% by weight of cobalt.

Catalyst C (Non-Conforming): Catalyst 15% Co on Phosphorus-Containing Alumina with 1% P An alumina in powder form (mean granulometry=90 μm) of 170 m²/g is impregnated by a solution of phosphoric acid $H_3PO_4$. The solid obtained is dried in an oven for 12 hours at 120° C. and then calcined in a tubular fixed-bed reactor at 420° C. for 2 hours. The support contains at present 1.1% by weight of phosphorus. An aqueous solution of cobalt nitrate is dry-impregnated on said alumina support upgraded with phosphorus. The solid obtained is dried at 120° C. in an oven for 12 hours and then calcined in air in a tubular fixed-bed reactor for 2 hours at 420° C. The resulting intermediate solid contains 8.9% by weight of cobalt. That solid is again impregnated with an aqueous solution of cobalt and then dried and calcined as described above. The final catalyst C contains 15.1% by weight of cobalt.

Catalyst D (Non-Conforming): Catalyst 20% Co on Alumina Stabilised by 5% of Co in Aluminate Form (Spinel)

A catalyst D is prepared by dry impregnation of an aqueous solution of cobalt nitrate on an alumina in powder form (mean granulometry=90 μm) of 170 m²/g. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of cobalt nitrate is impregnated on said support stabilised by cobalt in the form of spinel. The resulting solid is then dried in an oven for 12 hours and then calcined in air in a tubular fixed-bed reactor at 420° C. for 2 hours. It contains 13.8% by weight of cobalt. That intermediate solid is subjected to a fresh impregnation operation using a solution of cobalt nitrate, followed by drying and calcination which are identical to the preceding step. The final catalyst D is obtained in two preparation steps, containing 20.1% by weight of cobalt (the content of Co present in the spinel phase being included) and a maximum reducible cobalt content of 15.1% by weight under the above-described reduction conditions. The reducible cobalt content presents the active phase and is obtained by temperature programmed reduction (TPR, using the Anglo-Saxon terminology).

Catalyst E (Non-Conforming): Catalyst 20% Co on Silica-Containing Alumina with 5% SiO2 and 5% Co in Aluminate Form (Spinel)

A solution of cobalt nitrate is impregnated on a commercial support Siralox® 5 (Sasol Germany) containing 5% by weight of $SiO_2$, then the solid is dried in an oven for 12 hours at 120° C. and calcined at 800° C. in a tubular fixed-bed reactor for 2 hours. That high-temperature calcination operation makes it possible to form the cobalt aluminate spinel phase (5% by weight of cobalt). A solution of cobalt nitrate is impregnated on said support stabilised by silicon and cobalt in the form of spinel. The resulting solid is then dried in an oven for 12 hours and then calcined in air in a tubular fixed-bed reactor at 420° C. for 2 hours. It contains 13.6% by weight of cobalt. That intermediate solid is subjected to a fresh impregnation operation using a solution of cobalt nitrate, followed by drying and calcination which are identical to the preceding step. The final catalyst E is obtained in two preparation steps, containing 20.0% by weight of cobalt (the content of Co present in the spinel phase being included) and a reducible cobalt content of 15.0% by weight.

Catalyst F (Non-Conforming): Catalyst 15% Co on Silica-Containing Alumina with 5% $SiO_2$ and 1% P A solution of phosphoric acid $H_3PO_4$ is impregnated on a commercial support Siralox® 5 (Sasol Germany) containing 5% by weight of silica. The solid obtained is dried in an oven at 120° C. for 2 hours and then calcined in a flow of air in a tubular fixed-bed reactor at 420° C. for 2 hours. Thus that support is both stabilised by silicon (4.9% by weight of $SiO_2$) and by phosphorus (1.1% by weight of P). A solution of cobalt nitrate is impregnated on that stabilised support and in the same manner as before the solid is dried in an oven at 120° C. and then calcined in air at 420° C. The intermediate calcined solid contains 9.1% by weight of cobalt. As in the preceding examples that intermediate solid is again impregnated with an aqueous solution of cobalt, dried at 120° C. for 12 hours and then calcined in air in a tubular fixed-bed reactor at 420° C. The final catalyst F then contains 15.0% by weight of cobalt and is based on a support co-stabilised by silicon and phosphorus.

Catalyst G (Non-Conforming): Catalyst 20% Co on Phosphorus-Containing Alumina with 1% P and 5% Co in Aluminate Form (Spinel)

An alumina in powder form (mean granulometry=90 μm) of 170 m²/g is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of phosphoric acid $H_3PO_4$ is impregnated on the support stabilised by cobalt in the form of spinel. The solid obtained is dried in an oven for 12 hours at 120° C. and then calcined in a tubular fixed-bed reactor at 420° C. for 2 hours. The support contains at present 1.1% by weight of phosphorus and 5% by weight of cobalt in aluminate form.

An aqueous solution of cobalt nitrate is dry impregnated on that support upgraded with phosphorus and cobalt in the form of cobalt aluminate spinel. The solid obtained is dried at 120° C. in an oven for 12 hours and then calcined in air in a tubular fixed-bed reactor for 2 hours at 420° C. The intermediate solid obtained in that way contains 13.8% by weight of cobalt. That solid is again impregnated with an aqueous solution of cobalt and then dried and calcined as described above. The final catalyst G contains 20.2% by weight of cobalt (the Co content present in the spinel phase being included) and a reducible cobalt content of 15.2% by weight.

Catalyst H (According to the Invention): Catalyst 20% Co on Silica-Containing Alumina with 5% $SiO_2$ and 5% Co in Aluminate Form (Spinel) and 1% P A commercial support Siralox® 5 (Sasol Germany) containing 5% by weight of silica is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of phosphoric acid $H_3PO_4$ is impregnated on the support stabilised by cobalt in the form of spinel. The solid obtained is dried in an oven for 12 hours at 120° C. and then calcined in a tubular fixed-bed reactor at 420° C. for 2 hours. The support contains at present 1.2% by weight of phosphorus and 5% by weight of cobalt in aluminate form and about 5% by weight of silicon in the form of $SiO_2$.

An aqueous solution of cobalt nitrate is dry impregnated on that support upgraded with phosphorus, cobalt in the form of cobalt aluminate spinel and silicon. The solid obtained is dried at 120° C. in an oven for 12 hours and then calcined in air in a tubular fixed-bed reactor for 2 hours at 420° C. The intermediate solid obtained in that way contains 13.7% by weight of cobalt. That solid is again impregnated with an aqueous solution of cobalt and then dried and calcined as described above. The final catalyst H contains 20.1% by weight of cobalt (the Co content present in the spinel phase being included) and a reducible cobalt content of 15.1% by weight.

Catalyst I (According to the Invention): Catalyst 20% Co on Silica-Containing Alumina with 5% $SiO_2$ and 5% Co in Aluminate Form (Spinel) and 2.5% P A commercial support Siralox® 5 (Sasol Germany) containing 5% by weight of silica is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of phosphoric acid $H_3PO_4$ is impregnated on the support stabilised by cobalt in the form of spinel. The solid obtained is dried in an oven for 12 hours at 120° C. and then calcined in a tubular fixed-bed reactor at 420° C. for 2 hours. The support contains at present 2.5% by weight of phosphorus and 5% by weight of cobalt in aluminate form and 5% by weight of silicon in the form of $SiO_2$.

An aqueous solution of cobalt nitrate is dry impregnated on that support upgraded with phosphorus, cobalt in the form of cobalt aluminate spinel and silicon. The solid obtained is dried at 120° C. in an oven for 12 hours and then calcined in air in a tubular fixed-bed reactor for 2 hours at 420° C. The intermediate solid obtained in that way contains 13.8% by weight of cobalt. That solid is again impregnated with an aqueous solution of cobalt and then dried and calcined as described above. The final catalyst I contains 20.0% by weight of cobalt (the Co content present in the spinel phase being included) and a reducible cobalt content of 15.0% by weight.

Catalyst J (According to the Invention): Catalyst 20% Co on Silica-Containing Alumina with 5% $SiO_2$ and 5% Co in Aluminate Form (Spinel) and 5% P A commercial support Siralox® 5 (Sasol Germany) containing 5% by weight of silica is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of phosphoric acid $H_3PO_4$ is impregnated on the support stabilised by cobalt in the form of spinel. The solid obtained is dried in an oven for 12 hours at 120° C. and then calcined in a tubular fixed-bed reactor at 420° C. for 2 hours. The support contains at present 4.9% by weight of phosphorus and 5% by weight of cobalt in aluminate form and 5% by weight of silicon in the form of $SiO_2$.

An aqueous solution of cobalt nitrate is dry impregnated on that support upgraded with phosphorus, cobalt in the form of cobalt aluminate spinel and silicon. The solid obtained is dried at 120° C. in an oven for 12 hours and then calcined in air in a tubular fixed-bed reactor for 2 hours at 420° C. The intermediate solid obtained in that way contains 13.9% by weight of cobalt. That solid is again impregnated with an aqueous solution of cobalt and then dried and calcined as described above. The final catalyst J contains 19.9% by weight of cobalt (the Co content present in the spinel phase being included) and a reducible cobalt content of 14.9% by weight.

Catalyst K (According to the Invention): Catalyst 20% Co on Silica-Alumina with 10.7% $SiO_2$ and 5% Co in Aluminate Form (Spinel) and 1% P A commercial support Siralox® 10 (Sasol Germany) containing 10.7% by weight of silica is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Co aluminate spinel phase (5% by weight of cobalt). A solution of phosphoric acid $H_3PO_4$ is impregnated on the support stabilised by cobalt in the form of spinel. The solid obtained is dried in an oven for 12 hours at 120° C. and then calcined in a tubular fixed-bed reactor at 420° C. for 2 hours. The support contains at present 1.1% by weight of phosphorus and 4.9% by weight of cobalt in aluminate form and 10.6% by weight of silicon in the form of $SiO_2$.

An aqueous solution of cobalt nitrate is dry impregnated on that support upgraded with phosphorus, cobalt in the form of cobalt aluminate spinel and silicon. The solid obtained is dried at 120° C. in an oven for 12 hours and then calcined in air in a tubular fixed-bed reactor for 2 hours at 420° C. The intermediate solid obtained in that way contains 13.7% by weight of cobalt. That solid is again impregnated with an aqueous solution of cobalt and then dried and calcined as described above. The final catalyst K contains 19.8% by weight of cobalt (the Co content present in the spinel phase being included) and a reducible cobalt content of 14.8% by weight.

Catalyst L (According to the Invention): Catalyst 15% Co on Silica-Containing Alumina with 5% $SiO_2$ and 5% Ni in Aluminate Form (Spinel and 1% P A commercial support Siralox® 5 (Sasol Germany) containing 5% by weight of silica is impregnated by a solution of cobalt nitrate. After 12 hours of drying in an oven at 120° C. the solid is calcined for 4 hours at 800° C. in a flow of air in a reactor of traversed bed type. That high-temperature calcination operation makes it possible to form a Ni aluminate spinel phase (5% by weight of nickel). A solution of phosphoric acid $H_3PO_4$ is impregnated on the support stabilised by nickel in the form of spinel. The solid obtained is dried in an oven for 12 hours at 120° C. and then calcined in a tubular fixed-bed reactor at 420° C. for 2 hours. The support contains at present 1.1% by weight of phosphorus and 5% by weight of nickel in aluminate form and about 5% by weight of silicon in the form of $SiO_2$.

An aqueous solution of cobalt nitrate is dry impregnated on that support upgraded with phosphorus, nickel in the form of nickel aluminate spinel and silicon. The solid obtained is dried at 120° C. in an oven for 12 hours and then calcined in air in a tubular fixed-bed reactor for 2 hours at 420° C. The intermediate solid obtained in that way contains 8.5% by weight of cobalt. That solid is again impregnated with an aqueous solution of cobalt and then dried and calcined as described above. The final catalyst L contains 15.1% by weight of cobalt.

Example 2

Comparison of the Hydrothermal Resistances of the Catalysts A to L

Characterisation of the hydrothermal resistance is implemented by bringing 2 grams of each of the catalysts studied into contact with a mixture of water, heptane and pentane (17%/48%/35% by weight respectively) at 220° C. for 300 hours in an autoclave in a static mode under autogenous pressure.

After drying the product is finally analysed by X-ray diffraction, and a rate of boehmite formed is determined. Analysis by means of X-ray diffractometry is effected for all the examples using the conventional method involving powders by means of a diffractometer (CuKα1+2=0.15418 nm) equipped with a graphite curve back monochromator and a scintillation detector. The higher the rate of boehmite the less the catalyst is considered as resistant on the hydrothermal level.

The hydrothermal resistances of the solids A to L were characterised in accordance with the above-described protocol and are set forth in Table 1. Catalyst A has a substantial rate of boehmite which is taken as the base 100 for comparison with the other catalysts. The limit in terms of quantification of the boehmite by that procedure does not permit an analysis of a rate of boehmite of less than 2% of the value of the rate of boehmite of the catalyst A. An extremely resistant catalyst for which it is difficult to quantify a very small proportion of boehmite formed will therefore be considered as having a rate of boehmite after hydrothermal test of less than 2% of the value of the rate of boehmite of the catalyst A.

The catalysts according to the invention all have very good levels of performance in relation to the comparative catalysts.

Example 3

Catalytic Performances in the Fischer-Tropsch Process of the Catalysts A to L

The catalysts A to L, before being successively tested in respect of conversion of the synthesis gas, are reduced ex situ in a flow of pure hydrogen at 400° C. for 16 hours in a tubular reactor. Once the catalyst is reduced it is discharged in an argon atmosphere and encased in some Sasolwax® to be stored protected from the air before the test. The Fischer-Tropsch synthesis reaction is conducted in a slurry type reactor and operating continuously and operating with a concentration of 10% (vol) of catalyst in the slurry phase.

Each of the catalysts is in form of powder of a diameter of between about 30 and 170 microns.

The test conditions are as follows:
Temperature=230° C.
Total pressure=2 MPa
Molar ratio $H_2$/CO=2.

Conversion of the CO is maintained at between 45 and 50% throughout the entire duration of the test.

The test conditions are adjusted so as to be at iso conversion of CO, irrespective of the activity of the catalyst.

The results were calculated for the catalysts A to L in relation to the catalyst A serving as a reference and are set out in Table 1 below. The alpha paraffin selectivities are also stated as well as the methane selectivity.

Measurement of the selectivity in respect of alpha paraffin is effected by way of an analysis by gaseous phase chromatography of the effluents of the reaction, quantitative determination of the paraffins and calculation of the gradient of the curve log mol (%)=f (carbon number) which corresponds to the alpha coefficient.

The results in Table 1 show the catalytic performances of the catalysts A to L both in terms of activity and selectivity. It can be seen that the catalysts according to the invention have significant gains in terms of activity and selectivity (in particular alpha) in relation to the comparative catalysts.

TABLE 1

| | Target formulation | Relative % boehmite (by XRD analysis) after hydrothermal test | Relative activity after 300 hours of test under syngas load | Methane formation selectivity (%) | Selectivity α of long paraffins |
|---|---|---|---|---|---|
| | Comparative catalysts: | | | | |
| A | 15% Co on Al | 100 (base) | 100 (base) | 10 | 0.894 |
| B | 15% Co on AlSi (5% SiO$_2$) | 46 | 104 | 10 | 0.896 |
| C | 15% Co on AlP (1% P) | 26 | 106 | 10.5 | 0.892 |
| D | 20% Co on AlCo (5% Co) | 82 | 101 | 10 | 0.895 |
| E | 20% Co on AlSiCo (5% SiO$_2$, 5% Co) | 15 | 109 | 9.5 | 0.897 |
| F | 15% Co on AlSiP (5% SiO$_2$, 1% P) | 24 | 122 | 10.5 | 0.905 |
| G | 20% Co on AlCoP (5% Co, 1% P) | 51 | 106 | 8 | 0.896 |
| | Catalysts according to the invention: | | | | |
| H | 20% Co on AlSiCoP (5% SiO$_2$, 5% Co, 1% P) | 4 | 132 | 8 | 0.907 |
| I | 20% Co on AlSiCoP (5% SiO$_2$, 5% Co, 2.5% P) | <2 | 128 | 8 | 0.909 |
| J | 20% Co on AlSiCoP (5% SiO$_2$, 5% Co, 5% P) | <2 | 121 | 8 | 0.906 |
| K | 20% Co on AlSiCoP (10.7% SiO$_2$, 5% Co, 1% P) | <2 | 120 | 8.5 | 0.904 |
| L | 15% Co on AlSiNiP (5% SiO$_2$, 5% Ni, 1% P) | 5 | 129 | 8 | 0.905 |

The invention claimed is:

1. A catalyst containing an active phase comprising at least one metal of group VIIIB selected from cobalt, nickel, ruthenium and iron deposited on an oxides support comprising alumina, silica, phosphorus and at least one simple spinel $MAl_2O_4$ or mixed spinel $M_xM'_{(1-x)}Al_2O_4$ which is or is not partial, wherein M and M' are separate metals selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) and in which x is between 0 and 1, the values 0 and 1 being themselves excluded.

2. A catalyst according to claim 1 wherein said support is a phosphorus-containing silica-alumina or a phosphorus-containing silica-containing alumina in which spinel is included.

3. A catalyst according to claim 1 wherein the silica content of said support is between 0.5% by weight to 30% by weight with respect to the total weight of the support.

4. A catalyst according to claim 1 wherein the phosphorus content of said support is between 0.1% by weight and 10% by weight of said element with respect to the weight of the support.

5. A catalyst according to claim 1 wherein the spinel content is between 3 and 50% by weight with respect to the weight of the support.

6. A catalyst according to claim 1 wherein the content of metal M or M' is between 1 and 20% by weight with respect to the weight of the support.

7. A catalyst according to claim 1 wherein M is cobalt or nickel in the case of a simple spinel and M is cobalt and M' is magnesium or zinc in the case of a mixed spinel.

8. A catalyst according to claim 1 wherein the metal of group VIIIB is cobalt.

9. A catalyst according to claim 1 wherein the content of metal of group VIIIB is between 0.5 and 60% by weight with respect to the weight of the catalyst.

10. A catalyst according to claim 1 wherein the alumina from which the support is prepared has a specific surface area of between 50 m$^2$/g and 500 m$^2$/g, a pore volume measured by mercury porosimetry of between 0.4 ml/g and 1.2 ml/g and a monomodal pore distribution.

11. A catalyst according claim 1 wherein the support further comprises a simple oxide selected from titanium oxide, ceria and zirconia, alone or as a mixture.

12. A catalyst according to claim 1 wherein the catalyst further comprises at least one dopant selected from a noble metal of groups VIIB or VIIIB, an alkali metal element or an alkaline-earth element or an element of group IIIA.

13. A process for the preparation of a catalyst according to claim 1 comprising the following steps:
   a) an oxides support comprising alumina and silica is provided,
   b) said oxides support comprising alumina and silica is impregnated with an aqueous or organic solution of a phosphorus precursor, followed by drying and calcination so as to obtain a support comprising alumina, silica and phosphorus,
   c) the support comprising alumina, silica and phosphorus is impregnated with an aqueous or organic solution comprising at least one salt of metal M or M' selected from the group formed by magnesium (Mg), copper (Cu), cobalt (Co), nickel (Ni), tin (Sn), zinc (Zn), lithium (Li), calcium (Ca), caesium (Cs), sodium (Na), potassium (K), iron (Fe) and manganese (Mn) followed by drying and calcination at a temperature of between 700 and 1200° C. so as to obtain a simple spinel $MAl_2O_4$ or a mixed spinel $M_xM'_{(1-x)}Al_2O_4$ which is or is not partial, in which M and M' are separate metals and x is between 0 and 1, the values 0 and 1 being themselves excluded, and
   d) the oxides support comprising alumina, silica, spinel and phosphorus is impregnated with an aqueous or organic solution comprising at least one salt of metal from group VIIIB selected from cobalt, nickel, ruthenium and iron, followed by drying and calcination at a temperature of between 320° C. and 460° C. so as to obtain said catalyst.

14. A Fischer-Tropsch process for the synthesis of hydrocarbons comprising bringing a catalyst according to claim 1 into contact with a charge comprising synthesis gas under a total pressure of between 0.1 and 15 MPa at a temperature of between 150 and 350° C. at an hourly space velocity of between 100 and 20000 volumes of synthesis gas per volume of catalyst and per hour with an $H_2$/CO molar ratio in the synthesis gas of between 0.5 and 4.

15. A Fischer-Tropsch process according to claim 14 which is used in a reactor of slurry bubble column type.

* * * * *